US012689216B2

(12) United States Patent
Ren et al.

(10) Patent No.: US 12,689,216 B2
(45) Date of Patent: Jul. 21, 2026

(54) MODIFIED DYNAMIC VOLTAGE AND REACTIVE POWER CONTROL OF AC POWER DISTRIBUTION NETWORKS

(71) Applicant: Eaton Intelligent Power Limited, Dublin (IE)

(72) Inventors: Wei Ren, Plymouth, MN (US); Hossein Ghassempour Aghamolki, Edina, MN (US)

(73) Assignee: Eaton Intelligent Power Limited, Dublin (IE)

( * ) Notice: Subject to any disclaimer, the term of this patent is extended or adjusted under 35 U.S.C. 154(b) by 310 days.

(21) Appl. No.: 17/624,101

(22) PCT Filed: Jul. 2, 2020

(86) PCT No.: PCT/EP2020/025316
§ 371 (c)(1),
(2) Date: Dec. 30, 2021

(87) PCT Pub. No.: WO2021/001062
PCT Pub. Date: Jan. 7, 2021

(65) Prior Publication Data
US 2022/0360082 A1 Nov. 10, 2022

Related U.S. Application Data

(60) Provisional application No. 62/870,175, filed on Jul. 3, 2019.

(51) Int. Cl.
*H02J 3/16* (2026.01)
*G05B 13/04* (2006.01)
(Continued)

(52) U.S. Cl.
CPC .............. *H02J 3/16* (2013.01); *G05B 13/042* (2013.01); *H02J 13/12* (2026.01);
(Continued)

(58) Field of Classification Search
None
See application file for complete search history.

(56) References Cited

U.S. PATENT DOCUMENTS

| 9,906,035 | B2 | 2/2018 | Zhao et al. |
| 10,135,247 | B2 | 11/2018 | Fisher et al. |

(Continued)

FOREIGN PATENT DOCUMENTS

| EP | 2 362 977 A2 | 9/2011 | |
| WO | WO 2010/054084 A2 | 5/2010 | |
| WO | WO-2015183517 A1 * | 12/2015 | ............. G05B 13/02 |

OTHER PUBLICATIONS

Rahimi et al, "Evaluation of Requirements for Volt/Var Control and Optimization Function in Distribution Management Systems", 2012, Proceedings of 2012 IEEE International Energy Conference and Exhibition, pp. 334 (Year: 2012).*

(Continued)

*Primary Examiner* — David Earl Ogg
(74) *Attorney, Agent, or Firm* — DiBerardino McGovern IP Group LLC

(57) ABSTRACT

An electrical power distribution system configured to automatically regulate one or more Voltage/VAR control devices for optimization of one or more user defined metrics in an alternating current (AC) electrical power distribution system that includes one or more power distribution lines configured to transmit AC electrical power between a substation and a plurality of loads, each power distribution line including one or more Voltage/VAR control devices configured to regulate voltage and reactive power of the AC electrical power on the power distribution line according to an operational setting for each of the one or more Voltage/VAR control devices and one or more sensors configured to sense a sensed quality of the AC electrical power on the one or more power distribution lines with at least one communi- (Continued)

cation network communicating with the one or more Voltage/VAR control devices and the one or more sensors.

19 Claims, 6 Drawing Sheets

(51) Int. Cl.

| | |
|---|---|
| *H02J 13/12* | (2026.01) |
| *H02J 13/13* | (2026.01) |
| *H02J 103/30* | (2026.01) |
| *H02J 103/35* | (2026.01) |

(52) U.S. Cl.

CPC ....... *H02J 13/1331* (2026.01); *H02J 2103/30* (2026.01); *H02J 2103/35* (2026.01)

(56) References Cited

U.S. PATENT DOCUMENTS

| | | | |
|---|---|---|---|
| 2012/0029897 A1 | 2/2012 | Cherian et al. | |
| 2015/0112496 A1* | 4/2015 | Fisher ............... | H02J 13/00034 |
| | | | 700/298 |

| | | | |
|---|---|---|---|
| 2015/0234407 A1* | 8/2015 | Makino .................... | G05F 1/66 |
| | | | 700/291 |
| 2015/0236508 A1* | 8/2015 | Divan ....................... | H02J 3/16 |
| | | | 700/298 |
| 2016/0224045 A1* | 8/2016 | Wong ........................ | H02J 3/18 |
| 2017/0024505 A1* | 1/2017 | Pam ......................... | G06F 30/30 |
| 2017/0133849 A1* | 5/2017 | Feng ......................... | G05F 1/70 |
| 2018/0076622 A1* | 3/2018 | Wilkins ................. | H02J 3/381 |
| 2018/0226799 A1 | 8/2018 | Baker et al. | |
| 2020/0081421 A1* | 3/2020 | Dayama ............ | G05B 19/4184 |

OTHER PUBLICATIONS

PCT International Search Report for PCT/EP2020/025316, filed Jul. 2, 2020, mailed Oct. 26, 2020, 4 pages.

PCT Written Opinion of the ISA for PCT/EP2020/025316, filed Jul. 2, 2020, mailed Oct. 26, 2020, 6 pages.

* cited by examiner

| Device | $TD_{(0)}$ | $TD_{(1)}$ | $TD_{(2)}$ | $TD_{(3)}$ | $TD_{(4)}$ |
|---|---|---|---|---|---|
| VR_A | 0 | 0 | 2 | 1 | 1 |
| VR_B | -2 | -2 | -4 | -5 | -6 |
| VR_C | -2 | -2 | -1 | -1 | 0 |
| CB1 | 0 | 0 | 0 | 0 | 0 |
| CB2 | 0 | 0 | 1 | 1 | 0 |

300

| Device | TD$_{(0)}$ | TD$_{(1)}$ | TD$_{(2)}$ | TD$_{(3)}$ | TD$_{(4)}$ |
|--------|-----------|-----------|-----------|-----------|-----------|
| VR_A | 0 | 0 | 2 | 1 | 1 |
| VR_B | -2 → -2 | -2 → -2 | -4 -> -5 | -5 → -5 | -6 → -5 |
| VR_C | -2 | -2 | -1 | -1 | 0 |
| CB1 | 0 | 0 | 0 | 0 | 0 |
| CB2 | 0 | 0 | 1 | 1 | 0 |

FIG. 9

MODIFIED DYNAMIC VOLTAGE AND REACTIVE POWER CONTROL OF AC POWER DISTRIBUTION NETWORKS

RELATED APPLICATION INFORMATION

This application is a National Phase entry of PCT Application No. PCT/EP2020/025316, filed Jul. 2, 2020, which application claims the benefit of priority to U.S. Provisional Application No. 62/870,175, filed Jul. 3, 2019, the entire disclosures of which are incorporated herein by reference.

TECHNICAL FIELD

The present disclosure relates generally to alternating current (AC) electrical power distribution control methods, and more particularly to providing quantitative and dynamic systems and method for making complex decisions regarding the management of voltage and reactive power (volt-ampere reactive) losses in AC power distribution networks with distributed energy resources and regulatable network loads.

BACKGROUND

Distribution of AC power via an electric network or grid that consists of transmission and distribution circuits is typically controlled by an electric grid control system. Various components and subsystems within the electrical grid may communicate with and be controlled by a central management system, for example. Due to the large scale and variety of electrical sources and loads in most electrical grids, the centralized management of the generation and transmission of AC electrical power is an expansive and complex management problem.

Traditionally, voltage and reactive power control have been performed to overcome both over-voltage and under-voltage violations through controlling reactive power sources as well as the production, absorption, and flow of reactive power present in the electrical grid. The objective of this kind of voltage and reactive power control is to maintain the voltage profile over the electrical grid within acceptable limits and to reduce losses within the AC power distribution and transmission system. Traditional voltage and reactive power control have been achieved by reconfiguring controllable devices such as voltage regulators and load tap change of transformers for voltage control, and shunt reactors and shunt capacitors for reactive power control. In distribution systems, capacitors are typically used for reactive power compensation or power factor correction.

Historically, between about 3% to 9% of the total generated power is lost in the portion of the AC power distribution system between the substations and the consumers, which amounts to approximately 40% of the total losses within an AC power distribution system. The two largest sources of the losses are the step-down transformers and conductor resistance losses through the cable itself ($I^2R$ losses).

VAR occurs as a result of a phase shift between the AC voltage and current. A natural inductance of the load generally causes a lag in the current. As a result, the current sine wave and the voltage sine wave shift out of phase, thereby decreasing the usability of the transmitted electrical power. VAR impacts the distribution efficiency by reducing the power factor (i.e., the active power divided by the total transmitted power). Utility companies must account for both the active power component and the reactive power component when determining the total power requirement. The apparent power requirement can be calculated according to the following formula:

$$\text{Apparent Power} = (\text{Active Power}^2 + \text{Reactive Power}^2)^{1/2}$$

VAR therefore diminishes infrastructure capacity and increase capital requirements by requiring a larger amount of power to be generated than is actually usable. The larger power requirements contribute to further waste by incurring larger $I^2R$ losses through a natural resistive loss during transmission. Additionally, VAR contributes to peak demand penalties, power factor penalties, and larger voltage drops in transmissions outward from the substations. Accordingly, it is desirable to reduce VAR, while at the same time controlling the voltage.

Attempts have been made to reduce the overall demand for energy through an approach commonly referred to as conservation voltage reduction (CVR). According to CVR, utility companies attempt to reduce the distribution voltage to a lower limit in an attempt to reduce the total power consumption, particularly during times of peak demand. According to Ohm's law ($P=V^2/R$), by reducing the voltage it is possible to reduce the power needed to drive the load, while still ensuring that the lower American National Standards Institute (ANSI) voltage standard (e.g., 114 V) is not violated. The CVR approach is particularly effective in networks in which the loads have a constant impedance/resistance or a constant current (e.g., incandescent lights, resistive water heaters, electric stove tops, inverter-based devices, and etc.). On average, a voltage reduction of about 1% achieves about a 0.76% demand reduction on residential loads, and about a 0.41% demand reduction on industrial loads. Unfortunately, the CVR approach is less effective in networks having loads with variable impedance/resistance (e.g., TVs and other electronic devices).

The voltage within an electrical power distribution system is constantly changing as a result of changes in consumer demand, as well as power output from distributed energy resources (DERs) (e.g., decentralized solar photovoltaic and wind generators, etc.) connected along the distribution network. Although DERs serve an important role in harnessing renewable energy sources, certain DERs can be prone to rapid and unpredictable changes in energy output, for example cloud cover can significantly affect the output of a photovoltaic system. The ability to rapidly sense and regulate the voltage within an electrical power distribution system improves the ability of the system to work cooperatively with DERs.

Electrical power distribution systems presently use a number of different voltage control devices to regulate voltage, VAR and change the power factor. These voltage control devices can include three-phase voltage load tap changes (LTCs), which regulate the voltage for several distribution lines, single phase voltage regulators (VRs) and capacitor banks (CBs), which regulate the voltage and VAR along a given distribution line. Both LTCs and VRs typically include 33 taps to regulate the voltage output +/−10% by altering the turn ratio of a transformer. The 33 taps include one center "rated" tap, sixteen taps to boost or increase the voltage, and sixteen taps to buck or decrease the voltage, wherein each tap changes the output voltage by about 0.625%. CBs are simply turned on and off to raise and lower the reactive power (e.g., 600 KVAR) as necessary.

Over the years, distribution systems have been developed to manage these voltage control devices in an attempt to regulate distribution line voltage, manage VAR, decrease power losses, and, where possible, practice CVR. An example of one such system is shown in U.S. Pat. No. 10,135,247. Generally, the systems are heuristic based approaches that, although not guaranteed to be optimal, seek to find LTC, VR and CB settings that are sufficient to reach a satisfactory solution. Rather, the settings of the various devices are determined from expert knowledge, lookup tables and the like. Further, these systems usually fail to factor in the negative effects that frequent switching of LTC, VR and CB settings can have on the lifetime cycle limits of these components and corresponding capital requirements needed to repair and replace worn out power distribution components. Although such systems have proven to be effective, further optimization and improvements to efficiency of the entire power distribution system, including more efficient use of the various power distribution system components would be desirable.

SUMMARY OF THE DISCLOSURE

Embodiments of the present disclosure provide an AC electrical power distribution control system configured to dynamically modify power control to optimize one or more user-defined metrics, such as minimizing volt-ampere reactive (VAR) transmitted from transmission, decreasing the distribution system losses, keep the power factor near unity at the substation, maximizing conservation voltage reduction (CVR) gain, maximizing distributed energy resource (DER) penetration, and managing system voltage to remain within the American National Standards Institute (ANSI) standards, while conserving the cycle life of voltage control devices in the power distribution network by minimizing unnecessary switching.

One embodiment of the present disclosure provides an electrical power distribution control system configured to automatically regulate one or more voltage control devices for optimization of one or more user-defined metrics in an alternating current (AC) electrical power distribution system that includes one or more power distribution lines configured to transmit AC electrical power between a substation and a plurality of loads, each power distribution line including one or more voltage control devices configured to regulate voltage and reactive power of the AC electrical power on the power distribution line according to an operational setting for each of the one or more voltage and VAR control devices and one or more sensors configured to sense a sensed quality of the AC electrical power on the one or more power distribution lines with at least one communication network communicating with the one or more voltage control devices and the one or more sensors. The control system can include a controller operably connected to the at least one communication network. The controller can be configured to dynamically update a model of the plurality of power distribution lines with the sensed quality of the AC electrical power, utilize the model to dynamically modify a set of optimal operation settings for each of the one or more Volt/VAR control devices for a next period of operation based on both an estimated set of operational parameters for the next period of operation as determined by the model for the one or more power distribution lines as a function of one or more user-defined metrics and a historical set of operational settings for the one or more previous periods of operation, and communicate control signals to the one or more Voltage/VAR control devices to implement the set of optimal operation settings.

In one embodiment, the one or more user defined metrics can include at least one of such as minimizing volt-ampere reactive (VAR) transmitted from transmission, maximization of CVR gain, maximization of DER penetration, decreasing the distribution system losses, keep the power factor near unity at the substation, regulation of the voltage of the transmitted electrical power within ANSI standards, and minimization of unnecessary switching of the one or more voltage/VAR control devices. In one embodiment, modification of the set of optimal operational settings is based on an anticipated change in the one or more user-defined metrics both during and after a proposed change in the set of optimal operational settings. In one embodiment, each period of operation is between about five minutes and about fifteen minutes.

In one embodiment, the controller utilizes one or more set of candidate optimal operational settings pulled from a discrete pool of candidate optimal operational settings to reduce the number of calculations necessary for the determination of the optimal operational settings. In one embodiment, the controller randomly selects the one or more set of candidate optimal operational settings from the pool of candidate optimal operational settings, as an aid in improving the quality of the optimal operational settings. In one embodiment, the controller randomly selects a first Voltage/VAR control device to consider from the one or more voltage control devices in the determination of the optimal operational settings, as an aid in improving the quality of the optimal operational settings.

In one embodiment, the control signals communicated to the one or more Voltage/VAR control devices include control signals for at least one of a load tap changer, voltage regulator, and capacitor bank. In one embodiment, the sensed quality of the AC electrical power used to update the model includes at least one of a bus voltage, a total real power, a total reactive power, a power loss, and a feeder head power factor.

The summary above is not intended to describe each illustrated embodiment or every implementation of the present disclosure. The figures and the detailed description that follow more particularly exemplify these embodiments.

BRIEF DESCRIPTION OF THE DRAWINGS

The disclosure can be more completely understood in consideration of the following detailed description of various embodiments of the disclosure, in connection with the accompanying drawings, in which:

FIG. 9 is a graphical representation depicting a control solution, wherein an operational strategy of a single randomly selected Voltage/VAR control device is optimized, while the operational strategies of other Voltage/VAR control devices within the distribution line are held constant, in accordance with an embodiment of the disclosure.

Figure 1:
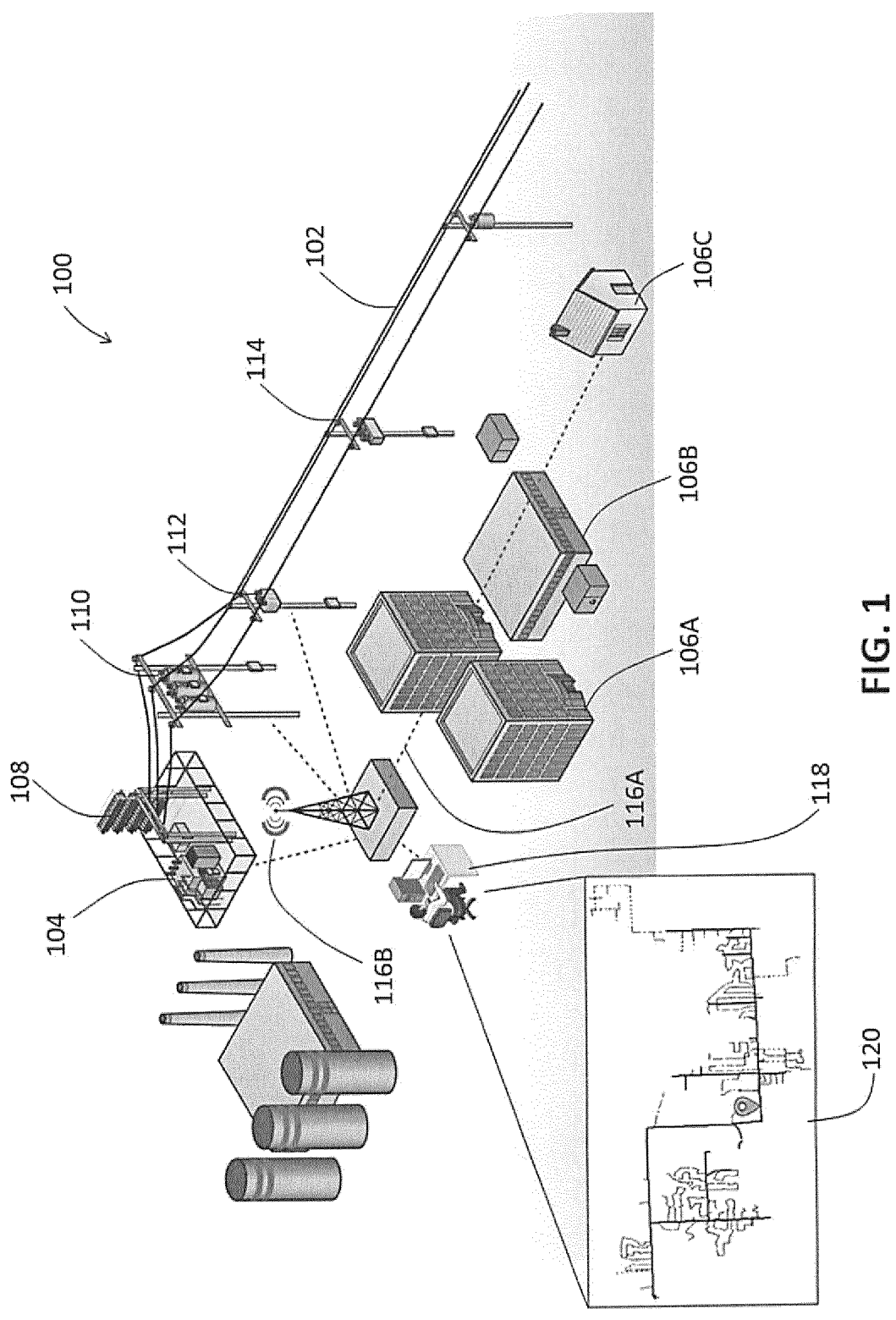
FIG. 1 is a system architecture diagram depicting an electrical power distribution system configured to minimize VAR transmitted from transmission and maximize CVR gain and DER penetration, while managing system voltage to remain within the ANSI standards and conserving the life of voltage control devices by minimizing unnecessary switching, in accordance with an embodiment of the disclosure.

While embodiments of the disclosure are amenable to various modifications and alternative forms, specifics thereof shown by way of example in the drawings will be described in detail. It should be understood, however, that the intention is not to limit the disclosure to the particular embodiments described. On the contrary, the intention is to cover all modifications, equivalents, and alternatives falling within the spirit and scope of the subject matter as defined by the claims.

DETAILED DESCRIPTION

Referring to FIG. 1, an AC electrical power distribution system 100 configured to optimize line voltage, reduce VAR transmitted from transmission system and practice CVR is depicted in accordance with an embodiment of the disclosure. In one embodiment, the power distribution system 100 is organized as a radial power distribution network having at least one distribution line 102 configured to transmit generated AC electrical power between a substation 104 and a plurality of loads 106A-C. In some embodiments, the system 100 includes multiple substations and distribution lines.

In one embodiment, voltage in the at least one distribution line 102 can be regulated by a load tap changer (LTC) 108. Although FIG. 1 depicts a single distribution line 102 for simplicity, it is contemplated that the LTC 108 can feed multiple distribution lines. Each of the distribution lines 102 can optionally include one or more voltage regulator (VR) and associated controls 110, and one or more capacitor bank (CB) and associated controls 112, thereby enabling further voltage/VAR regulation and modification to the power factor along the distribution line 102. In some embodiments, both the LTC 108 and the VR 110 can include a total of 33 taps, including one center "rated" tap, sixteen taps to raise the downstream voltage, and sixteen taps to lower the downstream voltage. The CB 112 can be configured to turn on and off to respectively raise and lower the downstream reactive power transmission as necessary. Collectively the one or more LTCs 108, VRs 110, and CBs 112 can be referred to as Voltage/VAR control devices.

Electrical power distribution system 100 can further include one or more sensors 114 positioned throughout the distribution network to measure qualities of the distributed power, such as bus voltages, total real power, total reactive power, power loss, feeder head power factor, and the like. Data sensed by the one or more sensors 114 can be communicated via a communication network 116A/B to a centralized controller 118. In one embodiment, the centralized controller 118 can include multiple networks or devices working in communication.

The centralized controller 118 can be configured to analyze the sensed data, generate a control solution (e.g., an optimal operational strategy or individualized settings for all of the Voltage/VAR control devices within the distribution system 100). The centralized controller 118 can then send a signal to the various Voltage/VAR control devices to affect the control solution via the communication network 116A/B. In one embodiment, one communication network 116A can be utilized to transmit the data sensed by the one or more sensors 114, and a separate communication network 116B can be utilized to transmit portions of the control solution to the various Voltage/VAR control devices. The communication networks 116A/B can be either wired or wireless.

In one embodiment, the centralized controller 118 utilizes a model 120 representing the physical components of the electrical power distribution system 100 as an aid in determining an optimal control solution in increments of time. For example, in one embodiment, the increments of time can be between about 5 minutes and about 15 minutes; although other increments of time are also contemplated.

Figure 2:
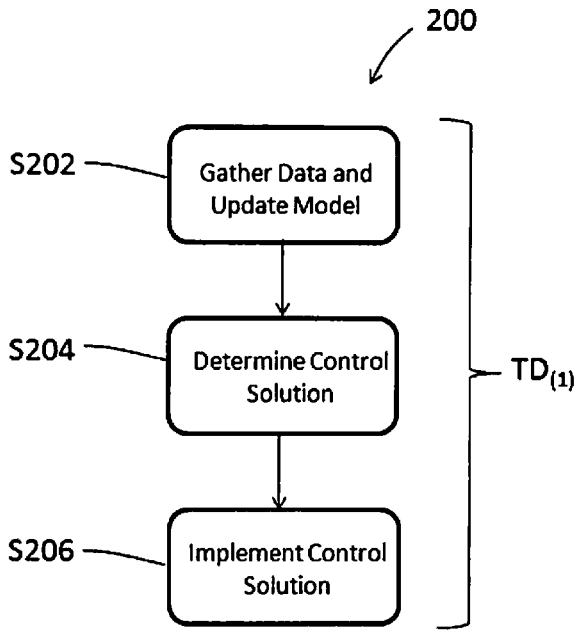
FIG. 2 is a flowchart depicting a process for determining a control solution and updating Voltage/VAR control devices of an electrical power distribution system, in accordance with an embodiment of the disclosure

Referring to FIG. 2, a process 200 for determining a control solution and updating the voltage control devices is depicted in accordance with an embodiment of the disclosure. At S202, data gathered by the one or more sensors 114 can be utilized to update the model 120, to reflect the various sensed qualities of the transmitted power during a given increment of time (e.g., $TD_{(1)}$). In one embodiment, the sensed data represents a snapshot of the qualities of transmitted power at a given point in time. In other embodiments, the sensed data is computed as a function of the various qualities over a discrete period of time (e.g., an average bus voltage over a one minute period). Where one or more changes have been made to one or more of the Voltage/VAR control devices, the system 100 can wait for an appropriate amount of time to allow for transient settling and/or stabilization before sensing the qualities of the transmitted power (e.g., up to one minute).

With the model 120 updated to represent a sensed state of the system 100, at S204, the centralized controller can determine a control solution in which various metrics across the system 100 are optimized. For example, in one embodiment, the various metrics to be optimized can include: (1) the power factor/reduction of VAR transmission; (2) decreases in power losses; (3) regulation of system voltage within the ANSI standard; (4) CVR gain through voltage reduction; (5) the life expectancy of voltage control devices (e.g., preservation of the LTCs, VRs and CBs by minimizing switching); (6) reactive compensation; and (7) increases in energy sales. Other metrics, which may be of interest to a user, are also contemplated. In some embodiments, the metrics can be directly measured, for example via sensors 114. In some embodiments, the metrics can be determined mathematically, for example via model 120. In some embodiments, one or more weighting factors can be assigned to one or more of the plurality of metrics to emphasize one or more metrics over others of the plurality of metrics. Metric optimization can represent a significant improvement over the heuristic-based approaches, which primarily base their control solutions on expert knowledge and lookup tables in an attempt to reach a satisfactory solution, rather than a single best solution.

In one embodiment, the optimization can utilize the model 120 to analyze how a potential change in the tap position of every LTC, VR and/or cycling on and off of every CB would affect optimization of the various metrics both during and after any switching of the voltage control devices. Accordingly, the system 100 not only seeks to optimize the system 100 to compensate for continual changes in the cumulative system power output and load demand, the system also seeks to efficiently utilize the Voltage/VAR control devices by minimizing switching. Typical LTCs have an expected lifetime of about 100,000 switching operations, VRs have an expected lifetime of between about 150,000-250,000 switching operations, and CBs have an expected lifetime of between about 13000-14000 switching operations, depending on the system and frequency of the switching, as well as vendor of the device and on-time maintenance. By minimizing switching operations, the usable time of these devices can be extended, thereby promoting a more efficient use of the system components.

Once a control solution has been determined, at S206, the centralized controller 118 can communicate with the various Voltage/VAR control devices to implement the control solution. After switching the various Voltage/VAR control devices, the one or more sensors 114 can be utilized to update the model 120, to reflect the various sensed qualities of the transmitted power during the next increment of time (e.g., $TD_{(2)}$). The cycle can then repeat as necessary optimize the desired metrics.

Figure 3:
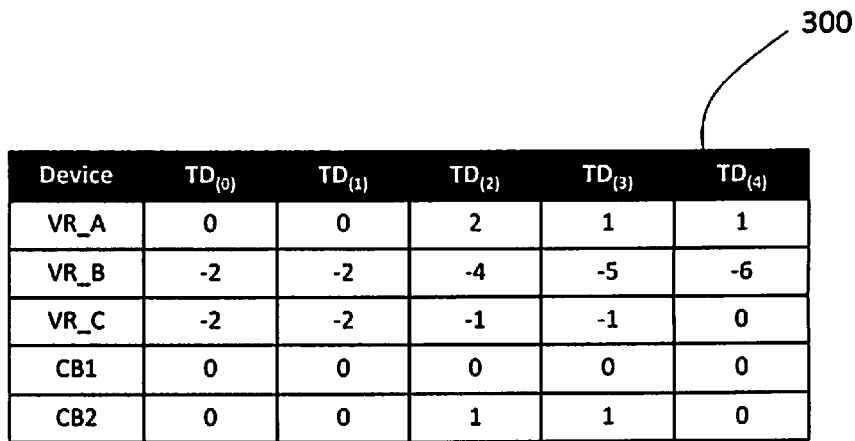
FIG. 3 is a graphical representation depicting a control solution, in accordance with an embodiment of the disclosure.

Referring to FIG. 3, an example control solution 300 is depicted in accordance with an embodiment of the disclosure. In this example, the control solution 300 includes a solution for five Voltage/VAR control devices, including three voltage regulators (VR-A, VR-B, and VR-C) and two capacitor banks (CB1 and CB2). An operational strategy for each of the control devices is determined for the next five increments of time (represented as time durations from $TD_{(0)}$ to $TD_{(4)}$). The numerical values in the control solution 300 indicate the operational strategy for each control device (i.e., the tap positions for the voltage regulators and the connection statuses for the capacitor banks).

Figures 4, 5:
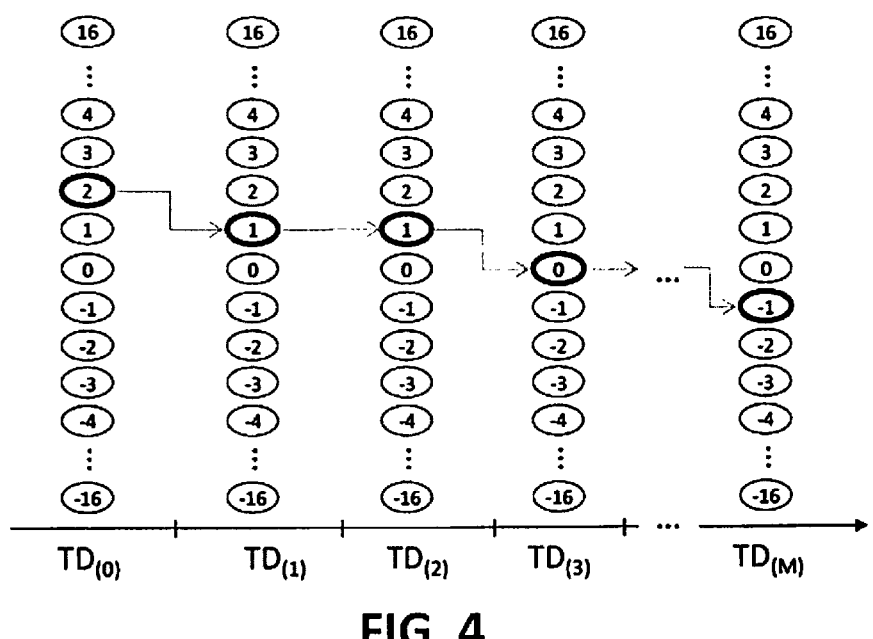
FIG. 4 is a graphical representation depicting dynamic programming optimization of a distribution line having a single voltage regulator, and accordance with an embodiment of the disclosure.
FIG. 5 is a graphical representation depicting dynamic programming optimization across an increment of time, in accordance with an embodiment of the disclosure.

In one embodiment, the optimization can be rooted in dynamic programming, in which optimization of the user selected metrics can be broken down into simpler sub-problems in a recursive manner. For simplicity, FIG. 4 depicts the dynamic programming optimization of a distribution line having only a single voltage regulator. The objective is to determine an optimal operational strategy for the next M increments of time, as indicated by the bold circles in FIG. 4. In each increment of time, there are 33 possible tap positions (from −16 to +16). Therefore, an exhaustive search of the whole space will yield $33^M$ evaluations.

Referring to FIG. 5, when there is only a single increment of time (i.e., M=1), the optimization problem can be solved by evaluating the selected metrics (e.g., reduction of transmitted VAR, voltage regulation, CVR gain, minimized switching, reactive compensation, increases in energy sales, decreases power losses, etc.) between the initial tap position (i.e., tap=2 in $TD_{(-1)}$) to each of the 33 possible tap positions. The tap position with the optimal performance as determined by evaluation of the metrics, corresponds to the optimal operational strategy for the control device (i.e., tap=1 in $TD_{(0)}$).

A mathematical expression for the optimization strategy follows:

$$MV_0(snow=i) = MT_0(spre=2,snow=i) + MO_0(snow=i), i \in [-16,16]$$
$$MV_0^* = Min\{MV_0(snow=i), i \in [-16,16]\}$$

Figure 6:
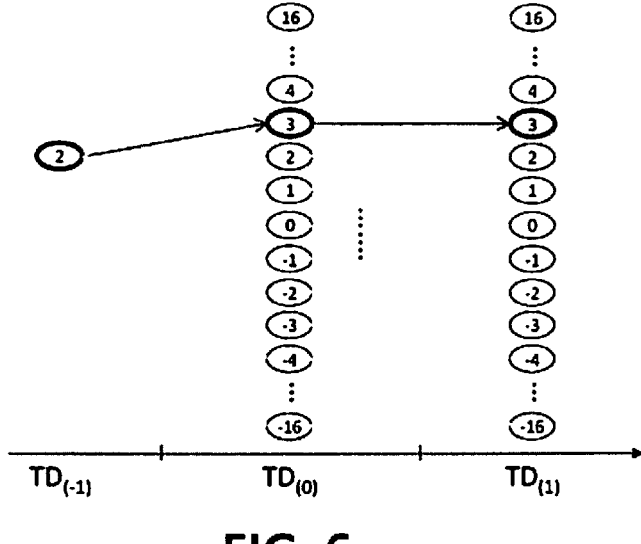
FIG. 6 depicts the graphical representation depicting dynamic programming optimization across two increments of time, in accordance with an embodiment of the disclosure.

-continued where,
$MV_0^*$: The optimal metric value achieved at $TD_{(0)}$
spre: The tap position at the previous time duration
snow: The tap position at the current time duration
$MV_0(snow=i)$: The metric value when VR has a tap position of i at $TD_{(0)}$
$MT_0(spre,snow)$: The metric value of moving the tap position from spre to snow at $TD_{(0)}$
$MO_0(snow)$: The metric value when tap position stays at snow at $TD_{(0)}$ With additional reference to FIG. 6, an additional increment of time (i.e., M=2) is evaluated. For each of the 33 ending tap positions at $TD_{(1)}$, there are 33 possible starting tap positions at $TD_{(0)}$. The optimal metric value for each possible tap position at $TD_{(1)}$ can then be calculated as follows:

$$MV_1(snow=i) = Min\{MV_0(snow=j) + MT_1(spre=j,snow=i) + MO_1(snow=i), j \in [-16,16]\}, i \in [-16,16]$$
$$MV_1^* = Min\{MV_1(snow=i), i \in [-16,16]\}$$

It should be noted that where the optimization strategy seeks to efficiently utilize the Voltage/VAR control devices, a new tap position that produces a better metric value may not be optimal when factoring in the switching required to move to the new tap position. That is, total optimization can be a factor of both the desired tap positions and the transition between the previous and desired tap positions.

Figure 7:
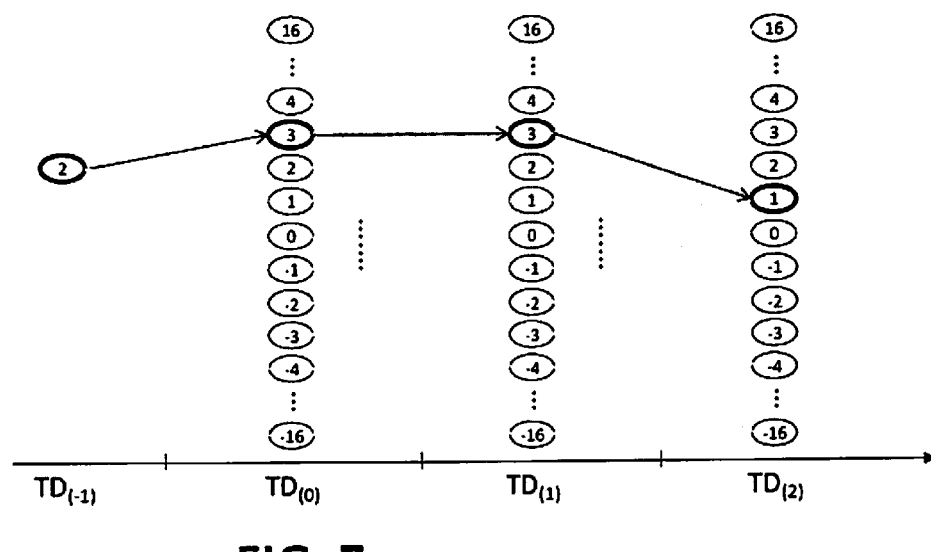
FIG. 7 depicts the graphical representation of FIG. 6, wherein the dynamic programming optimization is extended across an additional increment of time, in accordance with an embodiment of the disclosure.

With additional reference to FIG. 7, the optimization strategy continues when another increment of time is added (i.e., M=3). For each of the 33 ending tap positions at $TD_{(2)}$, there are 33 possible starting tap positions at $TD_{(1)}$. The optimal metric value for each possible tap position at $TD_{(2)}$ can then be calculated as follows:

$$MV_2(snow=i) = Min\{MV_1(snow=j) + MT_2(spre=j,snow=i) + MO_2(snow=i), j \in [-16,16]\}, i \in [-16,16]$$
$$MV_2^* = Min\{MV_2(snow=i), i \in [-16,16]\}$$

In one embodiment, the computation is similar to that of the previous time increment (i.e., M=2), without an exponentially increased effort. That is, the calculation of $MV_2$ (snow=i) may only require looking back to $TD_{(1)}$ by accessing the 33 total costs of $MV_1$(snow=i). In this embodiment, there is no need to look any further back in time because once a tap position at $TD_{(1)}$ is considered to be the best path toward $TD_{(2)}$, then the path from $TD_{(-1)}$ to $TD_{(1)}$ is established, so that no other path need be considered.

Applying dynamic programming to a capacitor bank can follow the same procedure, with the exception that instead of 33 possible tap positions during any increment of time, there are only two possible connection states (i.e., on or off) to be considered.

When multiple Voltage/VAR control devices are to be considered, dynamic programming still applies, but the total number of possible combinations in each increment of time increases exponentially. For this reason, in some embodiments, it may be desirable to apply a sequential dynamic programming-based optimization method in which solutions to be evaluated are selected from a pool of candidate solutions.

Figure 8:
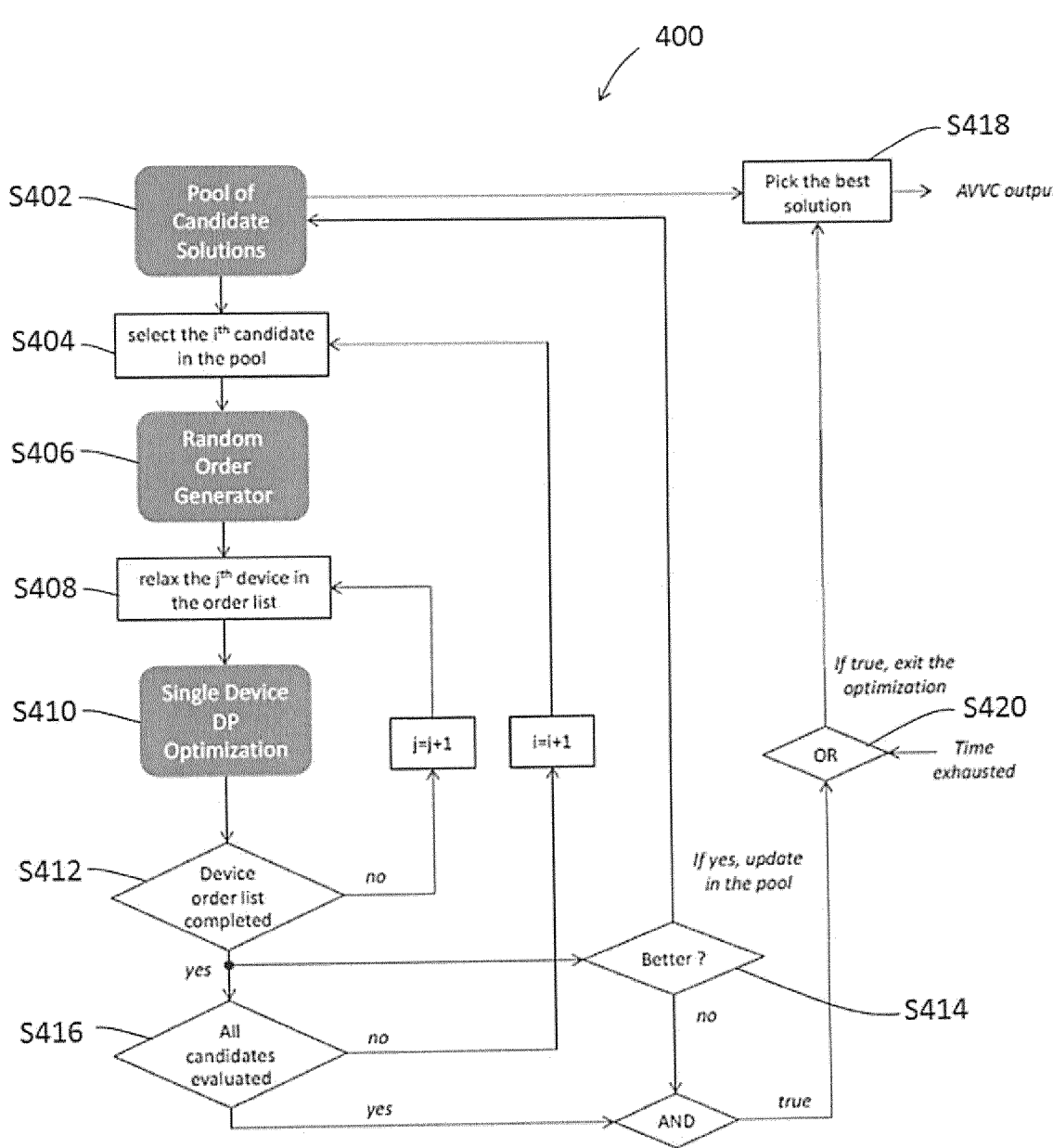
FIG. 8 is a flowchart depicting a sequential dynamic programming method, in accordance with an embodiment of the disclosure.

Referring to FIG. 8, a sequential dynamic programming method 400, is depicted in accordance with an embodiment of the disclosure. At S402, a pool of candidate solutions is established. The underlying purpose of the candidate pool is to limit the total number of calculations required to produce the optimal control solution, by beginning with a limited number of candidate solutions that are likely to be close to the optimal control solution. In one non-limiting embodiment, the pool can include up to twenty candidate solutions; although other quantities of candidate solutions are also contemplated.

In some embodiments, at least one candidate solution within the pool can include an unchanged operational strategy for each Voltage/VAR control device (i.e., all of the tap positions of the LTCs and VRs, and on-off connection states of the CBs remain unchanged from the previous increment of time). In some embodiments, at least one candidate solution within the pool can be selected based on historical optimized control solutions in similar conditions (e.g., optimized control solutions for similar load profile conditions, similar weather conditions, and/or a similar time of day, day of week, time of year, etc.), historical power usage data, power usage forecast data, historical DER output data, DER output forecast data, and other expert knowledge.

At S404, one candidate solution (e.g., the $i^{th}$ candidate) is selected from a pool of candidate solutions. In some embodiments, the candidate solution is selected randomly to inhibit bias toward a particular rationale in developing the pool of candidate solutions (e.g., to inhibit the optimization strategy from always beginning with an unchanged operational strategy for each voltage control device).

Once a candidate solution has been selected, at S406, one Voltage/VAR control device is randomly selected from the Voltage/VAR control devices to be considered first in the optimization strategy. At S408, the operational strategy of the selected voltage/VAR control device is relaxed, while the operational strategies of all other voltage control devices are fixed in position. At S410, dynamic programming optimization is performed on the relaxed voltage/VAR control device to find its optimal operational strategy for a particular increment of time.

With additional reference to FIG. 9, the optimization of a single randomly selected Voltage/VAR control device (e.g., VR-B), while holding the operational strategies of the other Voltage/VAR control devices (e.g., VR-A, VR-C, CB1, and CB2) constant according to S406-S410 is depicted in accordance with an embodiment of the disclosure. The purpose of randomly selecting a Voltage/VAR control device is to inhibit a bias towards a particular operational strategy, and generally move the optimization strategy out of a local convex area. Accordingly, in one optimization, the order of the devices to be optimized may be VR-A, CB1, VR-C, CB2, VR-B, while in another optimization, the order may be CB2, VR-B, VR-C, VR-A, CB1. In some embodiments, in an effort to reduce the overall number of calculations required to produce the optimal control solution, the optimization strategy can limit tap position changes to within a certain number of tabs from the current position (e.g., within +/−3 tab positions of the current tab position).

With continued reference to FIG. 8, at S412, this process of selecting a single Voltage/VAR control device to be relaxed, while holding all of the other voltage control devices fixed in position continues until each of the Voltage/VAR control devices within a line are optimized. Once all of the Voltage/VAR control devices are optimized, at S414, a determination is made as to whether the optimized control solution is better than the original candidate solution. If the optimize control solution is better, than the pool is updated with the new optimized control solution.

At S416, a determination is made as to whether all of the candidate solutions within the pool have been evaluated. If all of the candidate solutions have not yet been evaluated, then the method reverts to S404 and the next candidate solution is selected from the pool of candidate solutions. Once all of the candidate solutions have been evaluated, at S418, the best solution is selected for implementation. Alternatively, at S420, if the total computation time allotted for running the optimization strategy elapses, the best solution found at that time is selected for implementation.

It should be understood that the individual steps used in the methods of the present teachings may be performed in any order and/or simultaneously, as long as the teaching remains operable. Furthermore, it should be understood that the apparatus and methods of the present teachings can include any number, or all, of the described embodiments, as long as the teaching remains operable.

In this manner, the voltage across an electrical power distribution system can be optimized to minimize transmitted VAR, decrease power losses, increase energy sales, maximize CVR gain, maximize DER penetration, and ensure that the system voltage remains within the ANSI standards, while the effects of switching the voltage control devices are considered. Optimization in this manner represents a significant advance over traditional heuristic based approaches, which seek to reach a satisfactory solution, rather than an optimized-single best solution.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

What is claimed is:

1. An electrical power distribution control system configured to automatically regulate one or more voltage/volt-ampere reactive (Voltage/VAR) control devices for optimization of one or more user defined metrics in an alternating current (AC) electrical power distribution system that includes one or more power distribution lines configured to transmit AC electrical power between a substation and a plurality of loads, each power distribution line including one or more Voltage/VAR control devices configured to regulate voltage and VAR of the AC electrical power on the power distribution line according to an operational setting for each of the one or more Voltage/VAR control devices and one or more sensors configured to sense a sensed quality of the AC electrical power on the one or more power distribution lines with at least one communication network communicating with the one or more Voltage/VAR control devices and the one or more sensors, the electrical power distribution control system comprising:

a controller operably connected to the at least one communication network and configured to:

dynamically update a model of the one or more power distribution lines with the sensed quality of AC electrical power;

utilize the model to dynamically modify a set of optimal operational settings for each of the one or more Voltage/VAR control devices for a next period of operation based on: (i) an estimated set of operational parameters for the next period of operation as determined by the model for the one or more power distribution lines as a function of one or more user defined metrics, the one or more user defined metrics comprising a minimization of switching operations of the one or more Voltage/VAR control devices; and (ii) a historical set of the optimal operational settings for each of the one or more Voltage/VAR control devices for one or more previous periods of operation; and communicate control signals to the one or more Voltage/VAR control devices to implement the set of optimal operational settings, and wherein modification of the set of optimal operational settings is based an anticipated change in one or more user defined metrics both during and after a proposed change in the set of optimal operational settings.

2. The electrical power distribution control system of claim 1, wherein the one or more user defined metrics include at least one of minimization of transmitted volt-ampere reactive (VAR), decreases in power losses, maximization of conservation voltage reduction (CVR) gain, maximization of distributed energy resource (DER) penetration, and regulation of voltage of the AC electrical power within American National Standards Institute (ANSI) standards.

3. The electrical power distribution control system of claim 1, wherein each period of operation is between five minutes and fifteen minutes.

4. The electrical power distribution control system of claim 1, wherein the controller utilizes one or more set of candidate optimal operational settings from a discrete pool of candidate optimal operational settings to reduce a number of calculations necessary for the determination of the set of optimal operational settings.

5. The electrical power distribution control system of claim 4, wherein the controller randomly selects the one or more set of candidate optimal operational settings from the discrete pool of candidate optimal operational settings as a starting point.

6. The electrical power distribution control system of claim 1, wherein the controller randomly selects a first voltage/volt-ampere reactive (Voltage/VAR) control device to consider from the one or more voltage/VAR control devices as a starting point.

7. The electrical power distribution control system of claim 1, wherein the control signals communicated to the one or more Voltage/VAR control devices include control signals for at least one of a load tap changer, a voltage regulator, and a capacitor bank.

8. The electrical power distribution control system of claim 1, wherein the sensed quality of AC electrical power used to update the model includes at least one of a bus voltage, a total real power, a total reactive power, a power loss, and a feeder head power factor.

9. An electrical power distribution system controller comprising:

a model of one or more power distribution lines, each power distribution line including one or more voltage/volt-ampere reactive (Voltage/VAR) control devices configured to regulate voltage and reactive power of AC electrical power on the power distribution line according to an operational setting for each of the one or more Voltage/VAR control devices;

a processor configured to dynamically update the model of the one or more power distribution lines with a sensed quality of the AC electrical power, utilize the model to dynamically modify a set of optimal operational settings for each of the one or more Voltage/VAR control devices for a next period of operation based on both an estimated set of operational parameters for the next period of operation as determined by the model for the one or more power distribution lines as a function of one or more user defined metrics and a historical set of the optimal operational settings for each of the one or more Voltage/VAR control devices for one or more previous periods of operation, wherein the one or more user defined metrics comprises a minimization of switching operations of the one or more Voltage/VAR control devices, and wherein modification of the set of optimal operational settings is based an anticipated change in one or more user defined metrics both during and after a proposed change in the set of optimal operational settings; and a communication module configured to communicate control signals to the one or more Voltage/VAR control devices to implement the set of optimal operational settings.

10. A method comprising:

sensing a quality of AC electrical power on one or more power distribution lines;

updating a model of the one or more power distribution lines with the sensed quality of AC electrical power;

utilizing the model to dynamically modify a set of optimal operational settings for each of one or more voltage/volt-ampere reactive (voltage/VAR) control devices for a next period of operation based on both an estimated set of operational parameters for the next period of operation as determined by the model for the one or more power distribution lines as a function of one or more user defined metrics and a historical set of the optimal operational settings for each of the one or more Voltage/VAR control devices for one or more previous periods of operation; and communicating control signals to the one or more voltage/VAR control devices to implement the set of optimal operational settings, wherein utilizing the model to dynamically modify the set of optimal operational settings for each of the one or more voltage/VAR control devices is based an anticipated change in one or more user defined metrics both during and after a proposed change in the set of optimal operational settings.

11. The method of claim 10, wherein the user defined metrics include at least one of minimization of transmitted volt-ampere reactive (VAR), decreases in power losses, maximization of conservation voltage reduction (CVR) gain, maximization of distributed energy resource (DER) penetration, regulation of voltage of transmitted electrical power within American National Standards Institute (ANSI) standards, and minimization of unnecessary switching of the one or more voltage/VAR control devices.

12. The method of claim 10, wherein each period of operation is between five minutes and fifteen minutes.

13. The method of claim 10, further comprising utilizing one or more set of candidate optimal operational settings pulled from a discrete pool of candidate optimal operational settings to reduce a number of calculations necessary for the determination of optimal operational settings.

14. The method of claim 13, further comprising randomly selecting the one or more set of candidate optimal operational settings from the discrete pool of candidate optimal operational settings as a starting point.

15. The method of claim 10, further comprising randomly selecting a first voltage/volt-ampere reactive (Voltage/VAR) control device to consider from the one or more voltage/VAR control devices as a starting point.

16. The method of claim 10, wherein the control signals communicated to the one or more Voltage/VAR control devices include signals for at least one of a load tap changer, voltage regulator and capacitor bank.

17. The method of claim 10, wherein the sensed quality of AC electrical power used to update the model includes at least one of a bus voltage, a total real power, a total reactive power, a power loss, and a feeder head power factor.

18. An electrical power distribution system controller comprising:

a model of one or more power distribution lines, each power distribution line including one or more voltage/volt-ampere reactive (Voltage/VAR) control devices configured to regulate voltage and reactive power of AC electrical power on the power distribution line according to an operational setting for each of the one or more Voltage/VAR control devices;

a processor configured to dynamically update the model of the one or more power distribution lines with a sensed quality of the AC electrical power, utilize the model to dynamically modify a set of optimal operational settings for each of the one or more Voltage/VAR control devices for a next period of operation based on both an estimated set of operational parameters for the next period of operation as determined by the model for the one or more power distribution lines as a function of one or more user defined metrics and a historical set of operational settings for one or more previous periods of operation; and a communication module configured to communicate control signals to the one or more Voltage/VAR control devices to implement the set of optimal operational settings, wherein modification of the set of optimal operational settings is based an anticipated change in one or more user defined metrics both during and after a proposed change in the set of optimal operational settings.

19. The electrical power distribution system controller of claim 18, wherein the one or more user defined metrics comprises at least one of minimization of transmitted volt-ampere reactive (VAR), decreases in power losses, maximization of conservation voltage reduction (CVR) gain, maximization of distributed energy resource (DER) penetration, regulation of voltage of the AC electrical power within American National Standards Institute (ANSI) standards, and minimization of unnecessary switching of the one or more Voltage/VAR control devices.

*     *     *     *     *